United States Patent [19]

Massa

[11] 4,305,141

[45] Dec. 8, 1981

[54] LOW-FREQUENCY DIRECTIONAL SONAR SYSTEMS

[75] Inventor: Frank Massa, Cohasset, Mass.

[73] Assignee: The Stoneleigh Trust, Cohasset, Mass. ; Fred M. Dellorfano, Jr. and Donald P. Massa, Trustees

[21] Appl. No.: 104,278

[22] Filed: Dec. 17, 1979

Related U.S. Application Data

[63] Continuation-in-part of Ser. No. 914,009, Jun. 9, 1978, Pat. No. 4,198,705.

[51] Int. Cl.³ .............................................. G91S 15/42
[52] U.S. Cl. ................................................. 367/105
[58] Field of Search ............... 367/105, 107, 111, 113, 367/122, 124, 106, 910

[56] References Cited

U.S. PATENT DOCUMENTS 2,787,736  4/1957  Ellison et al. ........................ 367/124

*Primary Examiner*—Richard A. Farley

[57] ABSTRACT

A portable sonar surveillance system is disclosed which operates in the audible-frequency region where low attenuation loss minimizes the power requirement for achieving long-range detection capability. A lightweight, high-power transmitting transducer array approximately 1 ft. diameter, which operates efficiently in the 4-6 kHz range, is utilized in combination with a novel tri-cardioid hydrophone receiving array whose diameter is only a few inches to achieve a bearing resolution of 5°. The inventive system replaces enormous sized conventional low-frequency scanning sonar systems weighing tens of thousands of pounds. The disclosed system can be very effectively used as a long-range, light-weight "dunking sonar" for submarine surveillance patrol operations from helicopters or small patrol craft. The disclosed sonar system is economically practical for use in the 1 kHz frequency region, thus achieving ultra-long-range detection capability which cannot be obtained with conventional scanning sonar systems.

31 Claims, 13 Drawing Figures

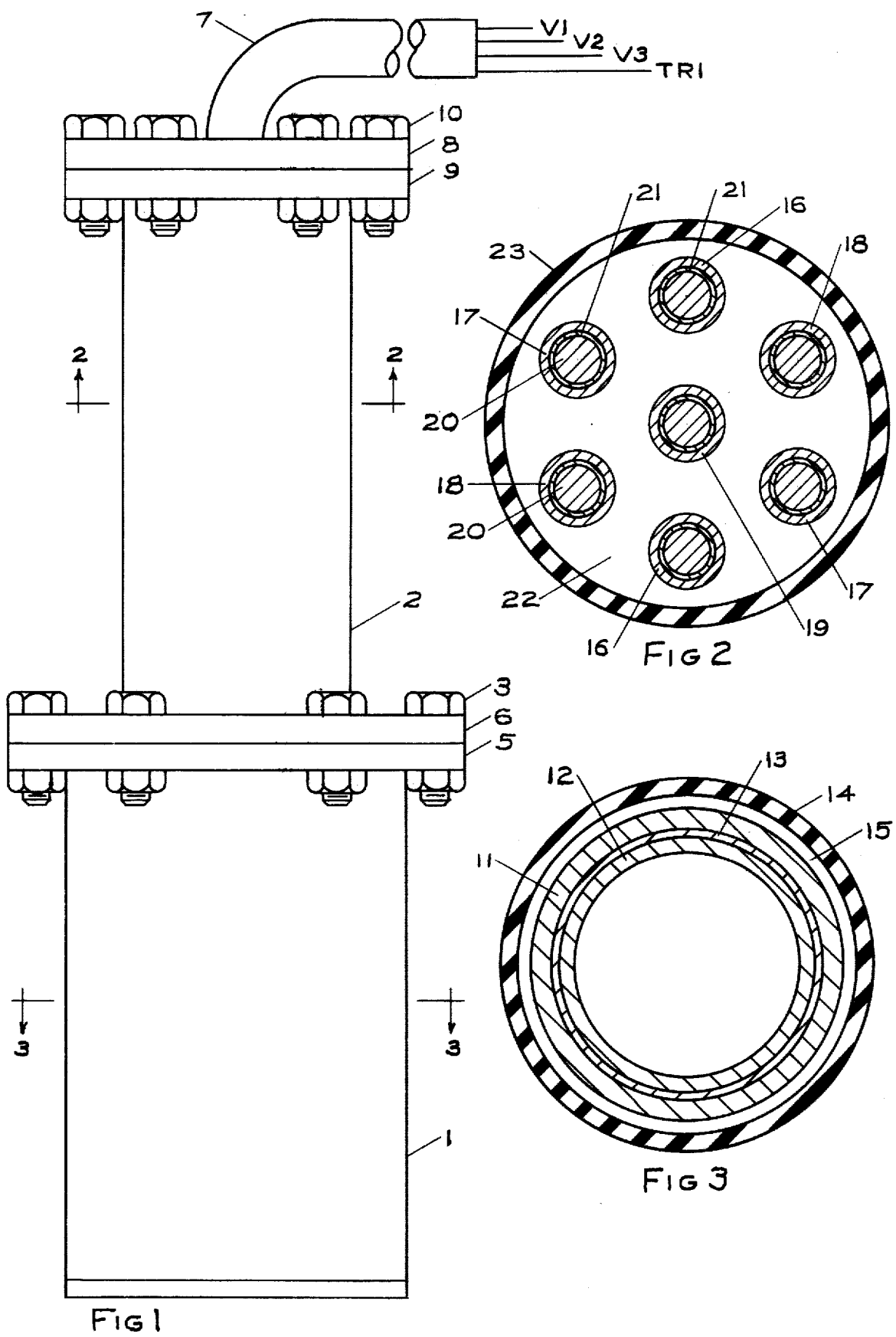

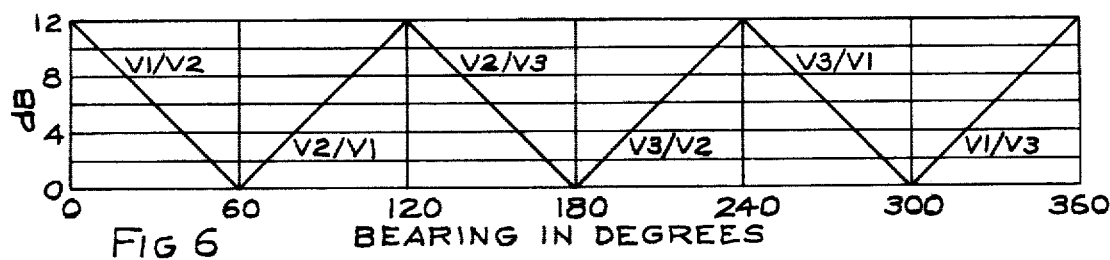
FIG 6 BEARING IN DEGREES
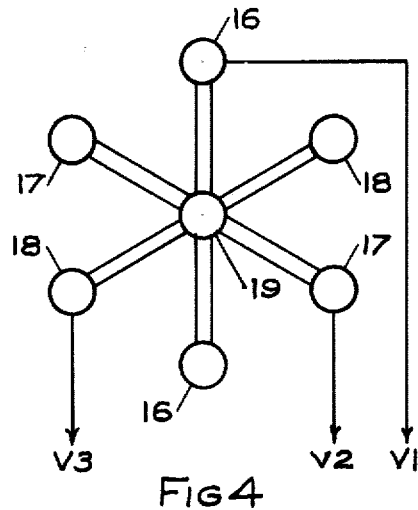
FIG 4
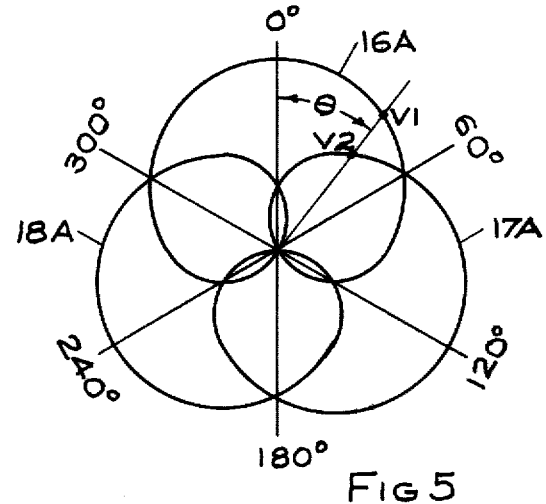
FIG 5
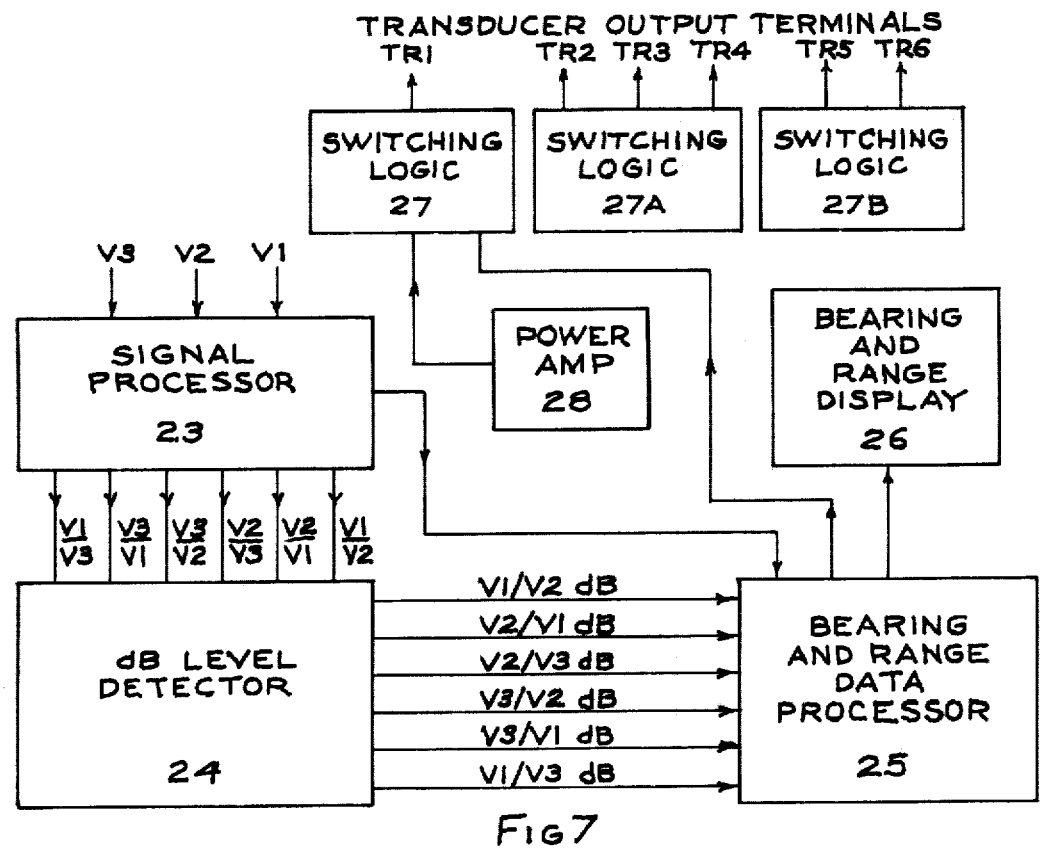
FIG 7

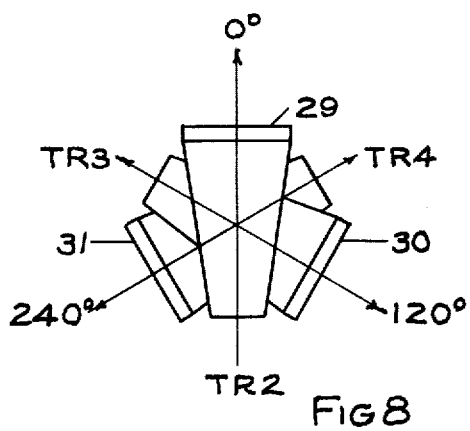
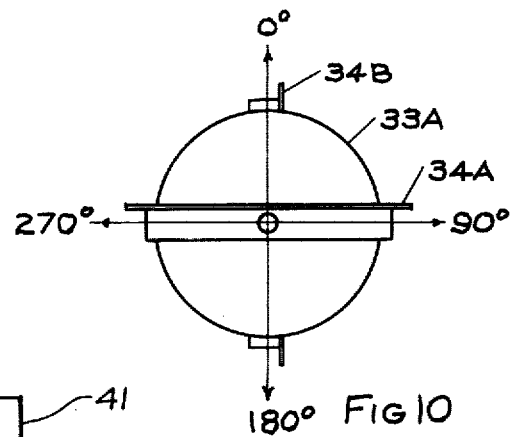
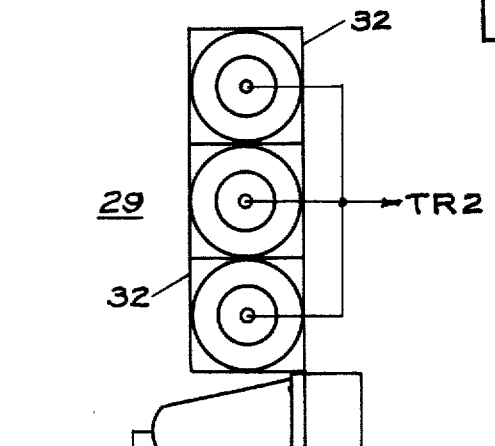
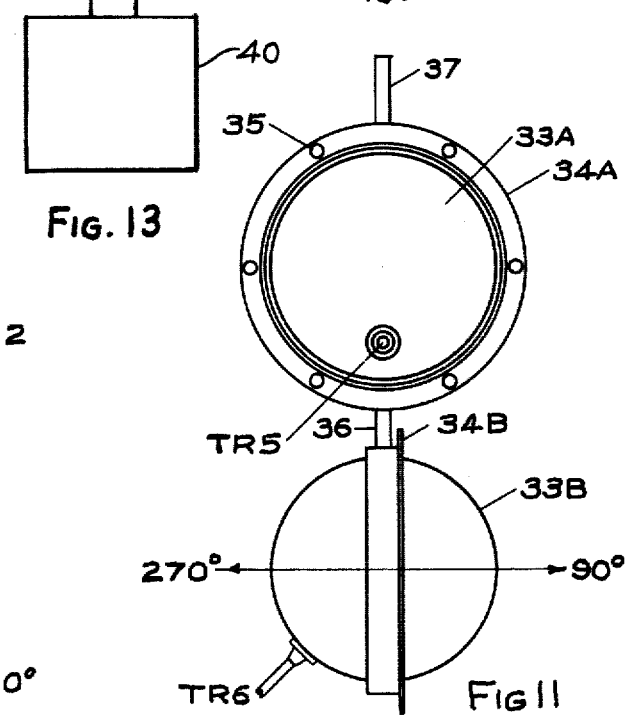
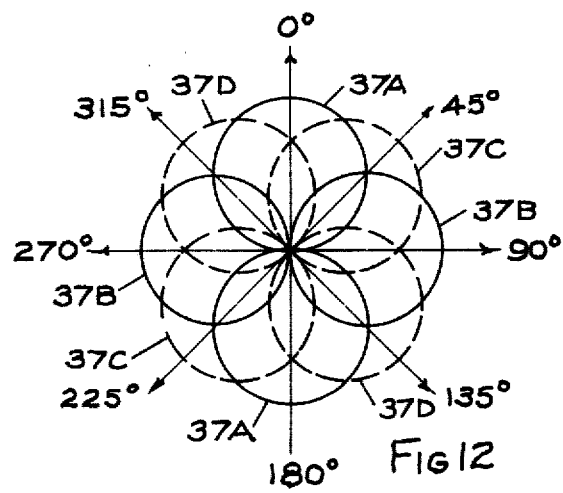

LOW-FREQUENCY DIRECTIONAL SONAR SYSTEMS

This invention is a continuation in part of my co-pending application Ser. No. 914,009, filed June 9, 1978, now U.S. Pat. No. 4,198,705 and is concerned with improvements in directional sonar systems and particularly with improvements in low-frequency directional sonar systems operating within the audible frequency region below approximately 15 kHz.

Early World War II sonar systems for use in detecting and locating submarines employed a directional circular piston type transducer approximately 1 ft. diameter which was operated at a frequency in the general vicinity of 25 kHz. The piston transducer was used as an acoustic search light mounted on the bottom of a ship so that its axis of maximum sensitivity could be rotated in azimuth. During operation the transducer would be rotated at discrete intervals of approximately 10° in azimuth, at which points a tone burst pulse was transmitted from the transducer, and the presence of a submerged target at the particular azimuth position would be detected by the return of a reflected echo from the target. The elapsed time between the initiation of the tone burst and the receipt of the return echo would indicate the range of the target. A smaller higher frequency version of this early search light type sonar is still being used for inexpensive depth sounders for the measurement of water depth beneath a vessel operating in relatively shallow waters and also for locating the presence and depth of a school of fish if it appears below the vessel.

During the latter period of World War II and continuing to the present day, scanning sonar replaced the search light type for use in submarine detection because the scanning sonar achieves instant bearing and range indication on the sonar targets. The transducers generally used in scanning sonar systems comprise cylindrical arrays of transducer elements which usually employ 36 or 48 vertical rows of elements equally spaced around the circumference of a cylindrical frame structure. Electrical delay lines are employed to form a narrow beam from a cylindrical sector of the transducer assembly. The transmission of the tone burst sound signal may be made omnidirectional if all the elements in the cylindrical array are connected together for transmitting, or the transmission may be confined to a specified angular zone by utilizing a selected portion of the total transducer array, as is well known in the art.

Concurrent with the advent of scanning sonar, it also became evident that long-range sonar detection was not feasible with the use of ultrasonic frequencies because of the relatively high attenuation losses that occur in transmission as the frequency increases. For example, at 25 kHz, the attenuation loss amounts to approximately 50 dB over a distance of 10 kiloyards for the returned echo. If the operating frequency is reduced to 5 kHz, the round-trip attenuation loss is reduced to 20 dB, and for a frequency of 1 kHz, the attenuation loss is 4 dB. These figures show very dramatically why lower frequencies are mandatory if long-range sonar detection is to be achieved. For example, if a 10,000 yard sonar range is desired, the acoustic power required at an operating frequency of 25 kHz to overcome the attenuation loss is 100 million times greater than the acoustic power required at 5 kHz. At 5 kHz, the acoustic power to overcome the attenuation losses is forty times greater than the power required at 1 kHz. Thus the necessity for using lower frequencies for long-range sonar is obvious.

The cylindrical scanning sonar transducer must be several wavelengths in diameter in order to obtain the necessary narrow beam angles required for its operation in locating the bearing of underwater targets. A widely used scanning sonar transducer which operates in the 5 kHz frequency region is 8 ft. diameter × 5 ft. high and uses 432 individual transducer element assemblies mounted in 48 rows of 9 elements on the 8 ft. diameter cylindrical frame. The transducer weighs in the neighborhood of 15,000 pounds and requires a large ship for supporting the structure. If the same type transducer were designed for operating in the 1 kHz region, the transducer would have to be about 40 ft. diameter × 25 ft. tall and would weigh over one million pounds. The stream-lined sonar dome to contain the transducer would be about the size of a submarine, which means it would be practically impossible to mount the transducer on conventional ships.

The inventive sonar system provides a means for achieving instant target bearing information with a receiving array structure that is only a fraction of a wavelength in diameter at the operating frequency compared with the requirement of an array structure which is many wavelengths in diameter for the conventional sonar systems now in use. Actually the inventive receiving array structure requires less than 5% of the diameter required by the present state of the art scanning sonar array structure for obtaining the same resolution in bearing accuracy for locating a submerged target.

Another very important application for the inventive sonar system is in aircraft submarine surveillance patrol operations where it is now impossible to use the large and heavy conventional structures. It is obvious that scanning sonar systems for use by aircraft must be relatively light and of small diameter so that they may be lowered and retracted from hovering helicopters during their echo-ranging surveillance operations. Scanning sonar systems for helicopter surveillance use, called "dunking sonar", have been notoriously unsuccessful for their intended use because of the very limited sonar ranges imposed by the high-frequency operational requirements dictated by the small size limitations imposed on the conventional state of the art transducers. To obtain the desired long sonar detection ranges that can only be achieved from low-frequency operation, the aircraft sonar surveillance systems have made use of passive underwater listening devices suspended from small expendable sonobuoys which are launched in large numbers by planes while on patrol. The floating sonobuoys remain active for a few minutes befor sinking, and broadcast by radio to the patrol aircraft the audible sounds picked up by the suspended hydrophones. The presence of a submarine may become evident from the audible sound signals picked up by the hydrophone provided the submarine is at close range and is moving at sufficiently high speed to generate a noise level that can be heard above the ambient noises in the sea. The passive listening sonobuoy submarine surveillance technique cannot obtain the bearing or range of a suspected presence of a submarine because of the inherent limitations of the passive listening sonar system. Tens of millions of dollars of expendable sonobuoys are used in patrol operations even though their capability to locate submarines is very ineffective as compared with active echo-ranging sonar.

The present invention overcomes the inherent limitations imposed by the enormous weight and size requirements of conventional scanning sonar systems if they are designed for use at frequencies within the audible frequency range. The inventive system to be described achieves bearing and range indication for submerged targets with the use of light-weight transducer assemblies and with the use of very small diameter directional sonar receivers which give bearing resolutions equivalent to the bearing resolutions of a conventional scanning sonar receiving transducer whose diameter is in the order of 25 to 50 times greater than is required by the inventive system. This means that the inventive system can be used as a low-cost light-weight portable sonar that can be easily lowered over the side of a small vessel, or can be easily lowered and raised from a helicopter. The inventive small-size sonar system can operate at low audio frequencies to acquire the same long-range target information as is now obtained from the largest ship-mounted scanning sonar systems that weigh over 50,000 pounds and cost several million dollars each.

The primary object of this invention is to provide a sonar system for indicating the bearing and range of submerged targets such as submarines and in which the diameter of the directional receiving transducer array is a small fraction of a wavelength at the operating frequency, as compared with several wavelengths in diameter, as is presently required for conventional scanning sonar systems.

Another object of this invention is to achieve improved long-range sonar detection capability by using a small diameter portable light-weight sonar directional receiving transducer array in combination with a small diameter transmitting transducer operating in the mid-audio-frequency region.

An additional object of this invention is to provide a very low-frequency sonar echo-ranging system for operating at a frequency below 2 kHz and using a transmitting and receiving transducer structure having a configuration that fits within a diameter which is less than one wavelength at the operating frequency and yet is capable of a resolution in bearing accuracy comparable to conventional scanning sonar transducer arrays having diameters in the order of 5 to 10 wavelengths or more.

Still another object of this invention is to provide a directional submarine mounted echo-ranging sonar system for use in the mid-audible-frequency region within the approximate frequency range 1 to 3 kHz and having a small horizontal dimensional configuration in the order of a foot or two in diameter, and capable of a resolution in bearing accuracy comparable to conventional prior art receiving transducer arrays whose size is in the order of 25 to 50 ft. in diameter or width dimension.

Another object of this invention is to combine a different specific type of small diameter transmitting transducer construction for use in each of the low, mid, and high audible frequency regions in order that acoustic power transmissions in the order of several kilowatts to as high as hundreds of kilowatts may be radiated from a small diameter transducer line array having a diameter or width dimension within the approximate range ¼ to 1 wavelength at the operating frequency.

Still another object of this invention is to provide a vertical line array of high-power directional transducers mounted as a plurality of separate vertical sections with separate electrical connections to each section, and with each section positioned to direct its axis of maximum output along a particular azimuth which is displaced in bearing from its neighboring section. The high-power transmitting array is combined with a tri-cardioid receiving array which instantly determines the bearing of the received echo and automatically causes the following pulse transmission to take place from the section of the array whose axis of maximum output lies within the sector from which the received echo arrived.

A further object of the invention is to utilize a pair of dipole high-power, low-frequency transducers with their axes of maximum sensitivity located 90° apart in azimuth, in combination with a tri-cardioid receiving array, and with circuit means for switching the power simultaneously to both transducers when the bearing indication of the received sonar echo shows that the target location is approximately midway between the two axes along which the dipole transducers are oriented.

Still another object of this invention is to utilize a small-size tri-cardioid receiving array in combinaton with a high-power, low-frequency transducer array whose vibratile surface is driven by an alternating force of constant magnitude, and in which the acoustic loading on the transducer radiating surface is designed to be less than 100% rho-c, whereby the acoustic power radiated is correspondingly increased approximately in inverse ratio to the reduction in rho-c loading within the maximum amplitude capability of the vibrating system.

These and other objects of the invention will become evident in the following detailed description. The novel features which are characteristic of the invention are set forth with particularity in the appended claims. The invention itself, however, both as to its organization and method of operation, as well as advantages thereof, will best be understood from the following description of several embodiments thereof when read in connection with the accompanying drawings, in which:

FIG. 1 illustrates one embodiment of the invention in which a small diameter tri-cardioid receiving array is mounted co-axially with an omnidirectional transducer line array in which the diameter of the vibratile structure is in the order of one wavelength or less at the frequency of operation.

FIG. 2 is a section taken along the line 2—2 of FIG. 1 and illustrates the lay-out of the seven omnidirectional line hydrophones in an array for achieving the tri-cardioid pattern.

FIG. 3 is a section taken along the line 3—3 of FIG. 1 and illustrates the construction of the omnidirectional transmitting line array transducer used with this illustrative embodiment of the inventive system.

FIG. 4 is a pictorial illustration of the hydrophone elements shown in FIG. 2 to obtain the tri-cardioid receiving response characteristic.

FIG. 5 shows the three cardioid patterns achieved for the tri-cardioid hydrophone array illustrated in FIG. 4.

FIG. 6 shows the relationship between the dB ratio of the voltages generated by adjacent cardioids as a function of the bearing angle of the received signal.

FIG. 7 is a schematic block diagram illustrating the system operation for the illustrative embodiment of the inventive sonar system shown in FIG. 1.

FIG. 8 is a top view illustrating another emodiment of the inventive sonar system in which the omnidirectional transducer of FIG. 1 is replaced by three groups of vertical line arrays of high-power directional transducers which are mounted within a relatively small diameter configuration with their axes of maximum sensitivity located 120° apart in azimuth.

FIG. 9 is a vertical view of the transducer array illustrated in FIG. 8.

FIG. 10 is a top view illustrating another variation of a transducer array for use in place of the omnidirectional transducer in FIG. 1 in which two high-power, low-frequency spherical dipole transducers are mounted with their major dipole radiating axes oriented 90° apart in azimuth.

FIG. 11 is a vertical view of the transducers illustrated in FIG. 10.

FIG. 12 shows the directional radiation patterns of the two transducers illustrated in FIGS. 10 and 11.

FIG. 13 is a schematic illustration of an underwater explosive depth charge that is detonated by a pressure switch at the desired depth to generate a shock wave pulse to serve as a low frequency sonar signal.

Referring more specifically to the figures, FIG. 1 illustrates one embodiment of the invention which comprises a transmitting transducer 1 in combination with an axially mounted receiving hydrophone array 2. The two transducer structures are attached to one another by means of the bolts 3 which clamp the flange portions 5 and 6 of the transmitting transducer 1 and receiving transducer 2. A multiconductor cable 7 is sealed through the flange 8 which is in turn secured and sealed to the flange portion 9 of the receiving transducer 2 by means of the bolts 10. The cross-sectional views in FIGS. 2 and 3 illustrate the internal structures of the transducers 2 and 1, respectively.

The transmitting transducer shown in cross-section in FIG. 3 comprises a line array of piezoelectric ceramic cylinders 11 assembled over a central steel tube 12. A layer of corprene 13 is used as a liner and pressure release member between the walls of the steel tube 12 and the ceramic cylinders 11. Corprene is also placed between the end faces of the ceramic cylinders to isolate the ceramic elements from one another. Electrical conductors are soldered to the inner and outer electrode surfaces of the ceramic cylinders in the conventional manner well known in the art. The wiring details and the details of the connections to the separate ceramic cylinders which comprise the line array are not shown in the drawings because the details are well known to any one skilled in the art and these details are not part of the invention. A cylindrical rubber tube 14 forms a water-proof enclosure for the transducer assembly, and castor oil 15 fills the space between the ceramic radiating surface and the rubber tubular housing 14. The specific transducer structure described is well known to any one skilled in the art, and the transducer construction by itself is not part of this invention which resides only in the combination of the transducer with the unique receiver of FIG. 2 to obtain a novel sonar system which achieves bearing indications of a sonar target with a high bearing resolution of approximately 5° with a receiving array structure which is a small fraction of a wavelength in diameter at the operating frequency.

The tri-cardioid directional receiver construction is illustrated in FIG. 2 which shows three identical pairs of omnidirectional ceramic line hydrophones 16, 17, and 18, arranged at the corners of a hexagon. Another identical line hydrophone 19 is placed at the center of the group, as shown. The ceramic cylinders which make up the line hydrophones 16, 17, 18, and 19 are placed over steel rods 20 using a corprene pressure release layer 21 to fill the spaces between the steel rods and the ceramic cylinders, as illustrated. Corprene washers are placed between the end surfaces of the ceramic cylinders which make up the line arrays (not shown in the drawings), and castor oil 22 fills the space inside the cylindrical rubber housing 23 in the conventional manner well known in the art to complete the assembly.

FIG. 4 illustrates the hydrophone receiving array to achieve a tri-cardioid directional pattern with the major axis of each cardioid spaced 120° from each other in the horizontal plane. The omnidirectional hydrophone pairs 16, 17, and 18 are connected out-of-phase to act as dipole receivers, and each dipole output is separately combined with the output of the center omnidirectional receiving hydrophone 19 to achieve the three cardioid receiving arrays with their sensitivity patterns 16A, 17A, and 18A oriented 120° from each other in the horizontal plane, as illustrated in FIG. 5. A more detailed description of the individual hydrophone connections to achieve the cardioid patterns is given in my co-pending application above mentioned. The separate output voltages from the tri-cardioid receivers, V1, V2, and V3 shown in FIG. 4 are connected to the output cable terminals V1, V2, and V3 illustrated in FIG. 1. The cable terminal TR1 in FIG. 1 is connected to the transmitting transducer 1. The detailed wiring connections are not shown in the figures in order to simplify the drawings. The wiring details will be obvious to any one skilled in the art, and to show them would serve no purpose other than to congest the drawings and thereby detract from the understanding of the inventive sonar system.

The relationship between the ratios of the tri-cardioid received signals V1, V2, and V3 and the absolute bearing angle of the received sonar echo signal is described in detail in my co-pending application, Ser. No. 914,009, which is made part of this disclosure by reference. FIG. 6 shows the relationship between the ratios of the magnitudes of the received signals from the tri-cardioid receivers and the bearing angle of the sonar target. FIGS. 4, 5, and 6 are similar to FIGS. 2, 3, 4, and 5 of my co-pending application where the mathematical proof of the data shown in FIG. 6 is presented. An examination of the data in FIG. 6 indicates that the measurement of the voltage ratios of the received signals from the three cardioid elements with an accuracy of ±1 dB will give a bearing accuracy within ±5°. This high bearing resolution is achieved with a receiving transducer array illustrated in FIG. 2 whose diameter is a small fraction of a wavelength. The preferred diameter of the array is 1/6 wavelength, for which case the sensitivity of the dipole pairs along their axes of maximum response is equal to the sensitivity of the omnidirectional central element in the array. The realization of a bearing resolution of 5° with the small-size tri-cardioid array, 1/6 wavelength in diameter, is comparable to the resolution achieved with a conventional receiving array 5 to 10 wavelengths in diameter, as is required with conventional scanning sonar systems. The achievement of high bearing resolution with the tri-cardioid receiver with a structure in the order of 1/30th the diameter of the conventional scanning sonar receiving array forms an important element of this invention for the improvement of low-frequency directional sonar systems.

The ceramic transducer structure illustrated in FIG. 3 used in combination with the tri-cardioid receiver illustrated in FIG. 2 is suitable only for the higher audio-frequency range above approximately 6 kHz in order to keep the diameter of the ceramic cylinders under 7 or 8 inches, which is the approximate economic size limit for the manufacture of ceramic cylinders.

The overall dimensions of the transducer configuration illustrated in FIG. 1 can be held within a diameter in the order of 1 ft. or less and be used as part of a light-weight portable directional sonar system in combination with the electronic circuit schematically illustrated by the block diagram in FIG. 7. The bearing and range data processor 25 includes a connection to the switching logic circuit 27 for use in transmitting a control signal for initiating the transmission of a tone burst signal from the power amplifier 28 to the transducer terminal TR1 each time a sonar signal is desired to be transmitted. The tone burst causes the transducer to transmit an acoustic pulse which radiates out from the transducer array. A submerged target, such as a submarine, will reflect the acoustic pulse, and the echo will return to the three cardioid receivers of FIG. 4. The output signals V1, V2, and V3 from the tri-cardioid receivers are connected to the signal processor 23 of FIG. 7, as shown. The data processor 25 measures the elapsed time between the initiation of the transmit pulse and the reception of the echo, and calculates the exact range of the target in a manner that is well known in the art.

The bearing indication of the sonar target is determined from a comparison of the ratios of the output voltages V1, V2, and V3 from the three cardioid receivers of FIG. 4 which are connected to the input terminals V1, V2, and V3 of the signal processor 23, as illustrated in FIG. 7. The signals V1, V2, and V3 represent the relative magnitudes of the output voltages from the three cardioid receiver patterns 16A, 17A, and 18A shown in FIG. 5 when a sonar signal is received along a particular bearing axis. The three signals are processed by conventional electronic circuits which are well known in the art and are not a part of this invention.

The circuit logic in the signal processor 23 compares the magnitudes of the three voltages V1, V2, and V3 when they appear at the output of the tri-cardioid receiver. The signal processor 23 will automatically determine which voltage is the largest and which is the second largest. It will then produce an output which is proportional to the ratio of the largest to the next largest signal.

For instance, if the bearing of the echo lies within the 0° to 60° zone, then the largest signal will be V1 and the second largest will be V2, as shown in FIG. 5. The only output signal from the signal processor 23 will be the V1/V2 output. This output signal will be proportional to the ratio of the input voltages V1 over V2. If the bearing of the echo lies within the 60° to 120° zone, then the largest signal will be V2 and the second largest will be V1, and the only output of the signal processor 23 would be the V2/V1 output. In like manner, the signal processor 23 would produce a single signal on one of its six outputs depending on the bearing of the echo. If the bearing of the echo happened to be exactly 60°, 180°, or 300°, then the magnitudes of two of the three voltages V1, V2, and V3 would be equal. In this case, the signal processor 23 would produce two output signals that are equal. For instance, if the bearing were 60°, then the voltages V1 and V2 would be equal, and the signal processor 23 would produce two equal signals on its V1/V2 and its V2/V1 channels.

Each of the six separate voltage ratio channels shown at the output of the signal processor 23 is connected to a separate input channel of the dB level detector 24 which transforms the linear input signal to a logarithmic dB level. Therefore, the dB level detector 24 will produce an output which is proportional to the ratio in dB of the largest to the next largest signal among the three voltages V1, V2, and V3 from the tri-cardioid receiver.

The output levels in dB from the level detector 24 are connected to the input of the bearing and range data processor 25. The data processor 25 contains well known electronic circuits to convert the dB voltage ratios to a true bearing by utilizing the look-up table of FIG. 6. The data processor 25 then automatically causes the bearing and range display 26 to show the bearing and range of the echo. This display 26 could be any that is well known in the art, such as a CRT display.

The described system provides a light-weight small-size transducer combination for permitting sonar detection of submarines with a small conveniently portable equipment which achieves a bearing resolution comparable to what is achieved by conventional scanning sonar systems of enormous size and weight which require expensive fixed installations on large ships. A particular application of the disclosed small-diameter light-weight sonar system is for use as a helicopter "dunking sonar". Previous attempts for use of helicopters for submarine patrol have been unsuccessful because of the poor performance of conventional scanning sonar systems with the small diameter transducer limitation imposed by the helicopter application. The described small-diameter high bearing resolution sonar system made possible by the use of the tri-cardioid receiver in combination with the small diameter transmitting transducers permit the successful application of efficient portable light-weight systems which will enormously improve the surveillance capability of portable sonar systems, such as helicopter "dunking sonar" for submarine detection, and will save tens of millions of dollars now being expended yearly with the present inefficient use of expendable sonobuoys for the purpose.

The system of FIG. 1 which uses a line array of ceramic cylinders for the transducer is limited for operation in the high audio-frequency range. To take advantage of the improved capability of modern large ship-mounted scanning sonars which use the mid-audio-frequency range for improving the sonar detection range, a small-diameter transducer configuration, illustrated in FIGS. 8 and 9, can be substituted for the transducer construction shown in FIG. 1. FIG. 8 shows a top view and FIG. 9 shows a vertical view of a high-power transducer array that can be designed for operation at more than 50% efficiency within the frequency region from approximately 3 kHz to 10 kHz. The transducer array comprises three vertically spaced rows 29, 30, and 31 of transducer elements 32. Each element 32 comprises a mass-loaded inertially-driven piston transducer which is more fully described in U.S. Pat. No. 3,328,751 dated June 27, 1967. A transducer design capable of accepting 1 kW tone bursts for each individual element 32 used in the array in the frequency range 4 kHz to 6 kHz has been successfully built by applicant, which can be assembled within a 1 ft. diameter circle, as illustrated in FIG. 8. The overall diameter of the structure will increase to 1½ to 2 ft. diameter for transducers designed to operate in the vicinity of 2 to 3 kHz. Each vertically spaced row of transducers illustrated in FIG. 9 has an approximately 120° horizontal beam angle which provides 360° horizontal coverage for the complete array illustrated. For illustrative purposes, three elements 32 are shown in each of the three vertical rows 29, 30, and 31. However, a greater number of elements may be used in each row if a narrower vertical beam angle is desired and if greater power output is required. It is preferable that the vertical dimension of each row of transducer elements be at least one wavelength, or a multiple of one wavelength, so that a null will result along the vertical axis, thereby minimizing the reflections from the surface and bottom during the transmission of the tone burst signal.

The vertical row 29 of transducer elements having the axis of maximum sensitivity facing 0° bearing are connected in parallel to a cable terminal TR2, as schematically illustrated in FIG. 9. The rows 30 and 31 facing 120° and 240° bearing, respectively, are connected to cable terminals TR3 and TR4, as indicated. When substituting the transducer array structure illustrated in FIGS. 8 and 9 for the transducer structure illustrated in FIG. 3, the switching logic circuit 27 in FIG. 7 is replaced by logic circuit 27A. Logic circuit 27A includes three output terminals TR2, TR3, and TR4 which are connected to transducer cable terminals TR2, TR3, and TR4 illustrated in FIG. 9. Logic circuit 27A includes logic for connecting the tone burst signal from the output of the power amplifier 28 sequentially to each of the three rows of transducers 29, 30, and 31. The time between sequential tone bursts is set by the processor 25. For example, the sequential tone bursts may be set at fixed intervals of 5 seconds if the sonar is operating in a search mode for a range of 10,000 ft. For a search mode of 20,000 ft., the tone burst intervals may be set at 10 second intervals. Upon acquisition of a target, the elapsed time for the return of the sonar echo will represent the target range, and the processor 25 can be made to control the logic in circuit 27A to pulse immediately after the reception of the target echo, if desired. Additional logic may be provided in 27A to cause the transmission of the tone burst signal repeatedly on the particular row of transducers facing the horizontal sector within which the echo bearing is indicated. The circuit details for achieving the desired processing such as, for example, the sequence just described are not shown because the circuits are well known to any electronic engineer skilled in the art, and the circuit details are not part of this invention.

The array structure using the transducers illustrated in FIGS. 8 and 9 can transmit acoustic power levels in the approximate range 120 to 130 dB. vs. 1 microbar at 1 yd. at a frequency in the region 4 to 6 kHz. This high power level is obtained with a small-diameter light-weight transducer configuration approximately 1 ft. in diameter, as described. This inventive combination, which has a bearing resolution of 5°, is comparable in performance to a conventional shipboard scanning sonar having approximately 10 times the diameter and 20 to 50 times the weight. The array illustrated in FIGS. 8 and 9 is portable and can be used effectively as a helicopter "dunking sonar" with a long-range detection capability comparable to a shipboard scanning sonar system. The effectiveness of the described system for submarine detection at long ranges by patrol helicopters or by small patrol vessels will obsolete the relatively ineffective use of expendable passive listening sonobuoys which are consumed in quantities of hundreds of thousands during routine patrol operations because of their very limited range of detection. In spite of the tremendous yearly expenditure of tens of millions of dollars for expendable passive sonobuoys, they do not give any bearing or range information nor are they effective at long ranges from a submarine. The disclosed sonar system overcomes all the limitations and ineffectiveness of the passive expendable sonobuoys.

FIGS. 10 and 11 illustrate another type of transducer array that can be substituted for the transducer shown in FIG. 3. When used in combination with the small-diameter high-resolution tri-cardioid receiver the relatively small diameter configuration of this type of array provides a comparatively small light-weight sonar system for operating at the lower audio frequencies below approximately 3 kHz. At these lower frequencies, the detection range for locating submerged submarines is extended to several miles because of the greatly reduced absorption loss of the sound transmission through water. FIG. 10 shows a top view and FIG. 11 shows a vertical view of the transducer array. The spherical transducers 33A, 33B are electromagnetic inertially-driven oscillating spheres which operate as dipoles and have cosine radiation patterns, as illustrated by the directional radiation patterns 37A and 37B in FIG. 12. The illustrated spherical transducers are constant electromagnetic force-driven structures which are fully described in U.S. Pat. No. 3,543,230, dated Nov. 24, 1970. If the diameter of the spherical dipole oscillating structures is between approximately ⅛ to ¼ wavelength at the operating frequency, the radiation resistance of the vibrating dipole spheres will be between approximately 25% to 50% rho-c of the medium. Under such conditions, the acoustic power output from the transducers will be increased inversely with the percentage reduction in rho-c loading resulting from the reduced diameter of the spherical structure relative to the wavelength of sound at the operating frequency. This increase in acoustic output will result if constant drive force is maintained by the electromagnetic drive system, and also if provision is made for the larger displacement of the sphere which will take place at the reduced percentage values of rho-c loading.

The spherical transducers 33A and 33B are mounted in rubber-lined circular flanges 34A and 34B, as shown. The rubber liner is contoured to the spherical surface so that the sphere remains securely positioned within the contoured rubber band and is free to oscillate by displacing the rubber within the mounting flange. A more detailed description of the rubber-lined portion of the mounting flange is shown in U.S. Pat. No. 3,699,508 issued Oct. 17, 1972. The axis of maximum response of transducer 33A is aligned along the 0°-180° bearing axis, and the transducer 33B is mounted along the 90°-270° axis, as illustrated in FIGS. 10 and 11. The holes 35, as shown in the flange member 34A, are used to bolt the transducers to a rigid frame structure. The mounting structure could be a welded steel frame with suitable circular mounting rings provided to mate with the flange members 34A and 34B. The mounting structure is not shown in detail because it is not in itself a part of the invention, and the construction of a mounting frame can be achieved by any structural mechanic skilled in the art. The mounting structure in FIG. 11 is schematically illustrated by the rod 36 which is welded to the flanges 34A and 34B, as illustrated, and the suspension rod 37 which is welded to the top of flange 34A, as illustrated in FIG. 11. Transducer 33A has a power supply cable terminal TR5 and transducer 33B has a cable terminal TR6, as shown. A single dipole transducer is shown in each of the orientations illustrated in FIGS. 10 and 11. If greater power is desired and if a narrower vertical beam angle is desired for concentrating the transmitted acoustic energy in the vertical direction, a plurality of spherical transducers could be mounted in each of the same vertical planes as the transducers 33A and 33B to form two vertical line arrays of dipoles displaced 90° from one another in azimuth. The cable terminal TR5 would then be connected to all the added transducers mounted in the same plane as 33A and the terminal TR6 would be connected to all the added transducers mounted in the same plane as 33B.

The horizontal radiation beam patterns for the transducers 33A and 33B are shown by the cosine patterns 37A and 37B, respectively, as illustrated in FIG. 12. The use of two dipole transducers oriented with their axes of maximum sensitivity displaced 90° in azimuth, as illustrated, achieves a unique advantage in covering the entire 360° in bearing detection, as will be described.

If the dipole array is substituted for the transducer in FIG. 1, the switching logic circuit 27 in FIG. 7 is substituted by the switching logic circuit 27B. Logic circuit 27B includes two output terminals TR5 and TR6 which are connected to the corresponding transducer terminals TR5 and TR6 shown in FIG. 11. Circuit 27B includes logic for connecting the tone burst signal from the output of the power amplifier 28 sequentially to each of the two transducer terminals TR5 and TR6. Each transducer covers a zone of sound radiation approximately 90° wide along both directions of the axis 0°-180° for transducer 33A and along both directions of the axis 90°-270° for the transducer 33B. Additional logic may be provided in switching logic circuit 27B to cause the tone burst signal from the output of the power amplifier 28 to be applied to the transducer whose major axis is most closely in alignment with the bearing of the previously received target echo. If the target echo is received along a bearing approximately midway between the bearings of the two right angle major axes of the dipole array, the logic circuit can be programmed to connect both dipoles together, and the electrical power from the amplifier 28 when supplied to the connected dipoles will generate an acoustic signal directed along an intermediate axis between the two right angle axes of the individual dipoles. For example, if the transducers 33A and 33B, which have the directional patterns 37A and 37B shown in FIG. 12, are connected together with the relative phase of the output terminals adding, the resultant radiation pattern will be as illustrated by 37C. If the relative phases of the output terminals from the transducers are reversed, the radiation of the acoustic energy will be as illustrated by 37D. Thus, it is possible to direct the transmission of the acoustic signal in a direction along any one of the eight horizontal axes spaced 45° apart in azimuth, as illustrated in FIG. 12, by means of selecting the connections to the transducers TR5 and TR6 by the logic circuit 27B, as required to direct the energy along an axis closest to the target bearing as determined from the bearing of the last received sonar target echo.

For fixed installations, such as along a coastline for permanent submarine surveillance and harbor protection, the 0° axis of the array can be fixed as desired, such as, for example, facing forward the open water, and the relative bearing is correspondingly established with reference to the fixed orientation of the 0° bearing axis of the array. For portable use, such as in helicopter suspended systems, the 0° axis of the array will be continuously varying. For such applications, the 0° axis of the array is aligned with respect to the axis of a magnetic compass which is built into the array structure. The compass is mounted so that its north pole axis will remain fixed relative to the rotation of the suspended array so that the compass always points to magnetic north. The relative displacement of the 0° axis of the array with respect to the north magnetic axis of the compass is transmitted through the transducer cable to the electronic processing circuit 23 and used for establishing the absolute magnetic bearing of the array 0° axis for each received sonar echo. Details of the compass design and the specific means for measuring the relative displacement of the magnetic north pole axis from the 0° array axis are not shown because they are well known in the art and do not form a part of this invention.

Several specific examples have been shown of an improved low-frequency high-power directional sonar system which achieves target bearing indications with a bearing angle resolution of approximately 5°, and uses a small light-weight portable sonar array which can be less than ⅛ wavelength in diameter. The disclosed portable system has the ability to locate a submarine at long range with an accuracy comparable to what is achieved by tremendously large and heavier scanning sonar systems which can only be mounted on large ships.

A special light-weight directional sonar system combination has been described using low-frequency dipole vibrating transducer elements smaller than one wavelength in diameter for achieving ultra long sonar ranges by the use of frequencies below approximately 3 kHz. Present conventional scanning sonar systems, if designed to operate in the 1 kHz region, would be prohibitive in size, weight, and cost to achieve the 5° bearing resolution that is obtained with the inventive sonar system.

A particular advantageous application of the disclosed small-diameter light-weight sonar systems is in helicopter surveillance for the detection of submarines. The use of the disclosed small light-weight sonar system operating in the mid-audio-frequency region to replace the conventional prior art high-frequency ∓dunking sonar" which is suspended by a cable from a retractable reel mounted on a helicopter will permit the accurate location of submerged submarines from a patrol helicopter which has never been successfully achieved with prior attempts to use conventional sonar systems because of their limitation in range and bearing accuracy caused by the dimensional limitations imposed on the conventional transducer arrays by the portability requirements of the application.

The ultimate in portability, light weight, and simplicity of operation may be achieved by a special modification of the disclosed sonar system for the long-range detection and location of submarines. If the transmitting transducer and its associated power supply is eliminated and only the tri-cardioid receiving hydrophone array and its associated signal processing electronics are retained, only a tiny light-weight tri-cardioid receiving structure remains attached to the end of a light-weight low-power microphone cable that can be handled from a very small reel. The transducer generated sonar tone burst which has been eliminated from the system is replaced by a small depth charge 40 as illustrated in FIG. 13 which is detonated by a pressure switch 41 in the conventional manner when it reaches a specified depth after being launched, thus initiating an acoustic shock wave pulse to serve as a low frequency sonar signal for use with the inventive light-weight portable sonar surveillance system. The resulting low-frequency components generated in the shock wave will be propagated efficiently at very long ranges. A reflected echo from a submerged submarine will return to the submerged tri-cardioid hydrophone, and its bearing will be automatically determined, as previously described in connection with the use of the transducer generated sonar tone burst. The range determination for the target will be made by the measurement of the elapsed time from the initiation of the shock wave (which is received by the submerged tri-cardioid hydrophone at the instant of the explosion) and the arrival of the reflected echo. Band pass filters may be used in the tri-cardioid hydrophone receiver channels to pass only the desired low-frequency region in the blast pressure spectrum and thereby improve the signal-to-noise ratio of the system.

Although a few specific examples have been given to illustrate the advantages of the disclosed invention, it should be understood that additional modifications and alternative constructions may be made without departing from the true spirit and scope of the invention. Therefore, the appended claims are intended to cover all such equivalent alternative constructions that fall within their true spirit and scope.

I claim:

1. In combination in a directional sonar system for the detection of the presence and the location of the position of an underwater sound reflecting target, a sound transmitting transducer adapted for the generation of a tone burst signal lying within the audible-frequency range upon being supplied with a tone burst of audio-frequency electrical power, a source of audio-frequency power, electrical switching means connecting said source of audio-frequency power to said transducer, control means for operating said switching means, a plurality of directional receiving hydrophone assemblies characterized in that the receiving sensitivity S of each hydrophone assembly as a function of angle $\theta$ from its normal axis of maximum sensitivity is defined by the approximate relationship $s = (1 + \cos \theta)$ over an angle of approximately $\pm 120°$ from its normal axis, structural support means for mounting said plurality of directional hydrophone assemblies in an array with the axis of maximum sensitivity of each hydrophone assembly pointing 120° apart in relative bearing from each other, said transmitting transducer characterized in that its horizontal dimension when operationally submerged underwater is less than two wavelengths of the radiated sound at the frequency of operation, said receiving hydrophone array characterized in that its horizontal dimension when operationally submerged under water is less than ½ wavelength of the received sound at the frequency of operation, a signal processor, electronic circuit means connecting the output of each directional hydrophone assembly to said signal processor, said signal processor characterized in that it includes means for comparing the ratios of the magnitudes of the output signal levels from each directional hydrophone assembly when said hydrophone array is activated by a sonar signal which is arriving from a direction whose bearing angle is unknown, and indicator means selectively responsive to the ratios of the magnitudes of said output signal levels from said directional hydrophone assemblies, whereby said indicator means indicates said unknown bearing angle.

2. The invention in claim 1 characterized in that said hydrophone array comprises six identical omnidirectional hydrophone elements located at the corners of a hexagon, and further characterized in that each diametrically opposite pair of hydrophone elements is connected with their output signals in phase opposition to form three identical dipole pairs symmetrically located with their axes oriented 120° from each other, and still further characterized in that a seventh omnidirectional hydrophone element is located in the center of the six element hexagonally spaced array, and further characterized in that the output from each dipole pair is separately combined with the output of the centrally-located hydrophone element, whereby a tri-cardioid receiving pattern is achieved for the total array structure.

3. The invention in claim 2 further characterized in that the center-to-center spacing of each diametrically opposed pair of hydrophone elements is approximately 1/6 wavelength of the sonar signal whose bearing angle is being indicated.

4. The invention in claim 3 further characterized in that each hydrophone element comprises a line hydrophone whose length is at least one wavelength of the sonar signal at the operating frequency, and still further characterized in that the axis of each line hydrophone is mounted in fixed parallel relationship to one another.

5. The invention in claim 4 further characterized in that each line hydrophone element comprises an axial assembly of polarized ceramic cylinders.

6. The invention in claim 5 characterized in that said transmitting transducer comprises a line radiator whose length is at least one wavelength of the sonar signal at the operating frequency.

7. The invention in claim 6 further characterized in that said line radiator comprises an axial assembly of polarized ceramic cylinders.

8. The invention in claim 7 characterized in that said transmitting transducer and said receiving hydrophone array are mounted coaxially with one another to form a unitary structure.

9. The invention in claim 8 further characterized in that said unitary structure includes a single multiconductor cable for its operation, whereby the supported structure can be suspended and lowered to variable depths as permitted by the total length of cable attached to said unitary structure.

10. The invention in claim 9 further characterized in that the diameter of the unitary structure is approximately 1 ft. or less and that its frequency of operation is within the approximate region 6 kHz to 15 kHz.

11. The invention in claim 1 characterized in that said sound transmitting transducer comprises a plurality of directional transducer line arrays, the length of each line array is approximately one wavelength of the sonar signal, or greater, at the frequency of operation, said line arrays further characterized in that the sound energy transmitted from each array is mostly confined within a horizontal sector subtending a specified angle, a mounting structure, means for attaching said transducer arrays to said mounting structure, with the longitudinal axes of said line arrays held in parallel or coaxial alignment, said mounting structure further characterized in that each transducer array is located with its axis of maximum sensitivity displaced in azimuth from its neighbor by an angle approximately equal to said specified angle which defines the horizontal sector within which the sound radiation from the array is mostly confined.

12. The invention in claim 11 further characterized in that said control means for operating said switching means includes means for sequentially switching said source of audio-frequency power from one transducer array to another at specified intervals of time.

13. The invention in claim 12 further characterized in that said control means for operating said switching means includes additional means for automatically connecting said source of audio power to the particular transducer array whose sound transmission zone is confined within a horizontal sector subtending a specified angle within which the received sonar echo bearing is located.

14. The invention in claim 13 further characterized in that the overall diameter of said mounted transducer arrays is less than 2 ft., and still further characterized in that the frequency of operation lies within the approximate region 3 kHz to 10 kHz.

15. The invention in claim 14 further characterized in that the transducer arrays comprise a plurality of transducer elements employing vibratile pistons whose radiating surfaces have transverse linear dimensions approximately ½ wavelength of the transmitted sound at the operating frequency.

16. The invention in claim 1 characterized in that said sound transmitting transducer comprises a plurality of vibratile transducer elements which operate as dipoles with a cosine directional radiation pattern, a mounting structure having a vertical axis, said mounting structure characterized in that support means are provided for attaching said vibratile dipole transducer elements, and further characterized in that the mounted transducer elements have their axes of maximum radiation located at right angles to the vertical axis of the said mounting structure, and still further characterized in that said mounted transducer elements are held in two separate horizontally aligned groups with the axis of maximum radiation of each group mutually perpendicular to one another in the horizontal plane of said mounting structure, and further characterized in that each group of transducers may contain one or more transducer elements.

17. The invention in claim 16 further characterized in that said control means for operating said switching means includes means for alternately switching said source of audio-frequency power to either of said two separate horizontally aligned groups of transducers.

18. The invention in claim 17 further characterized in that said control means for operating said switching means includes additional means for automatically connecting said source of audio power to the particular one of said two separate groups of transducers which generates the higher magnitude of sound intensity along the bearing axis of the previously received sonar echo.

19. The invention in claim 17 further characterized in that said control means for operating said switching means includes additional means for automatically connecting said source of audio power simultaneously to both groups of transducers whereby the axis of maximum transmitted sound intensity lies approximately midway between the two right-angle axes of maximum radiation intensity of each of the two separate groups of transducers.

20. The invention in claim 1 characterized in that said sound transmitting transducer comprises a plurality of vibratile spherical transducer elements which operate as dipoles with a cosine directional radiation pattern, a mounting structure having a vertical axis, said mounting structure characterized in that support means are provided for attaching said vibratile spherical transducer elements, and further characterized in that the mounted spherical transducer elements have their axes of maximum radiation located at right angles to the vertical axis of said mounting structure, and still further characterized in that said mounted spherical transducer elements are held in two separate horizontally aligned groups with the axis of maximum radiation of each group mutually perpendicular to one another in the horizontal plane of said mounting structure, and further characterized in that each group of transducers may contain one or more transducer elements.

21. The invention in claim 20 further characterized in that the diameter of said vibratile spherical transducer elements is less than one wavelength of the sound transmitted at the operating frequency.

22. The invention in claim 21 characterized in that the frequency of operation of said spherical transducer array is in the mid-audio-frequency range between approximately 1 kHz and 3 kHz.

23. The invention in claim 22 characterized in that the vibratile spherical dipole transducer elements are driven by an approximately constant electromechanical force, independent of the percentage rho-c loading on the surface of the vibrating sphere.

24. The invention in claim 23 further characterized in that the diameter of said vibratile spherical transducer elements is between approximately ⅛ to ¼ wavelength at the operating frequency in the medium.

25. In combination in a portable light-weight directional sonar system for the detection of the presence and location of the position of an underwater sound reflecting target, a sound transmitting transducer line array adapted for operation within the audio-frequency range below 15 kHz to generate an audio-frequency tone burst signal upon being supplied with a tone burst of audio-frequency electrical power, a tri-cardioid receiving hydrophone, means for mounting said tri-cardioid hydrophone in a fixed position relative to said transducer line array, said hydrophone mounting means characterized in that the axis of maximum sensitivity of each cardioid hydrophone element is displaced in azimuth 120° from its neighboring cardioid hydrophone element, a source of audio-frequency power, electrical switching means for connecting said source of audio power to said transmitting transducer, control means for operating said switching means, a signal processor, electronic circuit means for connecting the output of each cardioid hydrophone element to said signal processor, said signal processor characterized in that it includes means for comparing the ratios of the magnitudes of the output signal from each of the three cardioid hydrophone elements when said tri-cardioid hydrophone is activated by a sonar signal arriving from a direction of unknown bearing angle, and indicator means selectively responsive to the ratios of the magnitudes of the output signal levels from the three cardioid hydrophone receiving elements, whereby said indicator means indicates said unknown bearing angle.

26. In combination in a portable light-weight directional sonar system for the indication of bearing and range of an underwater sound reflecting target, an explosive underwater sound source, means for activating said underwater explosive sound source, whereby a shock wave signal is generated by said underwater sound source, a tri-cardioid receiving hydrophone comprising three cardioid receivers mounted with their axes of maximum sensitivity displaced in azimuth 120° from its neighboring cardioid receivers, a signal processor, electronic circuit means for connecting the output of each cardioid hydrophone receiver to said signal processor, said signal processor characterized in that it includes means for comparing the ratios of the magnitudes of the output signals from each of the three cardioid hydrophone receivers when said tri-cardioid hydrophone is activated by a shock wave signal which is arriving from an unknown bearing angle, and indicator means selectively responsive to the ratios of the magnitudes of the output signal levels from the three cardioid hydrophone receiving elements, whereby said indicator means indicates said unknown bearing angle.

27. The invention in claim 26 characterized in that said signal processor includes a low-frequency band-pass filter for allowing only a specified narrow band of low frequencies to be recognized in the shock wave signal generated by the explosive underwater sound source whereby the signal-to-noise ratio of the receiving system is improved.

28. The invention in claim 27 characterized in that said tri-cardioid receiving hydrophone comprises six identical omnidirectional hydrophone elements located at the corners of a hexagon, and further characterized in that each diametrically opposed pair of hydrophone elements is connected with their output signals in phase opposition to form three identical dipole pairs symmetrically located with their axes oriented 120° from each other, and still further characterized in that a seventh omnidirectional hydrophone element is located in the center of the six element hexagonally spaced array, and further characterized in that the output from each dipole pair is separately combined with the output of the centrally located hydrophone element, whereby a tri-cardioid receiving pattern is achieved for the total array structure.

29. The invention in claim 28 further characterized in that the center-to-center spacing of each diametrically opposed pair of hydrophone elements is approximately 1/6 wavelength of the sonar signal whose bearing angle is being indicated.

30. The invention in claim 29 further characterized in that each hydrophone element comprises a line hydrophone whose length is at least one wavelength and still further characterized in that the axis of each line hydrophone is mounted in fixed parallel relationship to one another.

31. The invention in claim 30 further characterized in that each line hydrophone element comprises an axial assembly of polarized ceramic cylinders.

* * * * *